United States Patent
Velke

(10) Patent No.: US 6,290,487 B1
(45) Date of Patent: Sep. 18, 2001

(54) FUEL INJECTION METHOD AND DEVICE TO INCREASE COMBUSTION DYNAMICS AND EFFICIENCY IN COMBUSTION EQUIPMENT OPERATING WITH FLUID HYDRO CARBON FUEL

(76) Inventor: William H. Velke, P.O. Box 154, 277 Campbellville Road, Campbellville, Ontario (CA), L0P 1B0

( * ) Notice: Subject to any disclaimer, the term of this patent is extended or adjusted under 35 U.S.C. 154(b) by 0 days.

(21) Appl. No.: 09/579,535

(22) Filed: May 26, 2000

(51) Int. Cl.[7] .................................................. F23D 11/44
(52) U.S. Cl. ............................ 431/11; 431/247; 431/242
(58) Field of Search .............................. 431/11, 248, 352, 431/353, 244, 242, 247, 207

(56) References Cited

U.S. PATENT DOCUMENTS

| | | | | |
|---|---|---|---|---|
| 1,030,843 | * | 6/1912 | Dunham et al. | 431/11 |
| 1,402,747 | * | 1/1922 | Doble | 431/11 |
| 1,546,038 | * | 7/1925 | Smith | 431/11 |
| 1,876,168 | * | 9/1932 | Richardson | 431/11 |
| 2,955,420 | * | 10/1960 | Schirmer | 431/11 |
| 2,983,312 | * | 5/1961 | Finley et al. | 431/11 |
| 3,101,593 | * | 8/1963 | Britton et al. | 431/11 |
| 4,008,041 | * | 2/1977 | Roffe et al. | 431/11 |
| 4,095,933 | * | 6/1978 | Schmacher | 431/11 |
| 4,726,763 | * | 2/1988 | Newman | 431/353 |
| 5,080,580 | * | 1/1992 | Clapp | 431/11 |
| 5,149,260 | * | 9/1992 | Foust | 431/11 |
| 5,472,341 | * | 12/1995 | Meeks | 431/11 |
| 5,567,142 | * | 10/1996 | Purdy | 431/18 |
| 6,042,368 | * | 3/2000 | Champion et al. | 431/11 |

* cited by examiner

Primary Examiner—Ira S. Lazarus
Assistant Examiner—Josiah C. Cocks

(57) ABSTRACT

A method for providing fuel injection in combustion equipment by increasing the velocity of fuel flow delivered to an appliance incorporating a combustion zone and a burner therein, such as to increase ignition speed and flame speed during the combustion process and to reduce the appliance's harmful stack emissions, by employing a device which increases fuel volume while at the same time reducing fuel density through extracting heat from the appliance's combustion zone in order to pre-heat fuel for delivery to the appliance's burner at a constant, pre-set operating temperature of between 100 degrees Fahrenheit and the fuel's flash point temperature.

18 Claims, 2 Drawing Sheets

FUEL INJECTION METHOD AND DEVICE TO INCREASE COMBUSTION DYNAMICS AND EFFICIENCY IN COMBUSTION EQUIPMENT OPERATING WITH FLUID HYDRO CARBON FUEL

FIELD OF THE INVENTION

The present invention relates to the improvement of the combustion efficiency of conventional fluid hydrocarbon fuels, such as natural gas and propane gas when employed as fuel for residential, commercial and industrial space heating, process heating and cooling appliances or equipment, whereby such combustion efficiency improvement is obtained through reducing the fuel's density while at the same time increasing the fuel's volume and flow speed at delivery of it to the burner orifice in the combustion zone of such appliances or equipment.

BACKGROUND OF THE INVENTION

It is generally recognized that combustion ability of certain heavy waste oil employed as furnace fuel may be improved by significantly pre-beating, vaporizing or pre-mixing such fuel with vaporized gases or other vapors prior to combustion. It is also understood, that in many cases a heating appliance itself does not provide sufficient heat to effect such fuel vaporization or similar fuel conditioning treatment, and therefore additional means, such as electric heating coils and the like, have to be installed in order to facilitate such conditioning or pre-combustion treatment of heavy waste oil fuels.

It is further known that such high temperature pre-heating and vaporizing treatment is especially useful to effectively reduce viscosity of such heavy fuel in order to render it at all usable, and a number of prior art disclosures describe various complicted methods and devices specifically developed for that purpose.

In U.S. Pat. No. 3,876,363, La Haye et al. discloses a method, which uses an external source of heat as well as part of the combustion chamber heat, to finely atomize a hydrocarbon fluid such as fuel oil to produce an emulsion of the oil with a secondary fluid prior to fuel oil combustion, thereby increasing combustion efficiency and minimizing pollutant discharge during combustion of such emulsified fuel mixture. For this purpose, the fuel is pre-heated to a temperature of between 150 to 250 degrees Fahrenheit.

In U.S. Pat. No. 2,840,148, I. W. Akesson discloses a furnace burner-blower arrangement, which employs pressure and heat to pre-treat heavy fuel oil prior to combustion. The fuel oil is heated by way of a heating element which is controlled by thermostats to maintain a certain oil temperature range, but without stating any specific and most advantageous operating fuel oil temperature range.

In U.S. Pat. No. 2,781,087, Peter Storti et al. disclose a rotary cup type, heavy oil burner system, which circulates the fuel through the burner on its way to the atomizer nozzle. This application further utilizes an electric heating device to pre-heat the fuel oil in a thermostatically controlled oil reservoir prior to combustion. This system presents a distinct improvement over other prior art, in that it greatly reduces the fuel oil temperature fluctuations inherent in other fuel pre-heating systems. However, no specific fuel oil operating temperature range is indicated to claim combustion efficiency or emission reduction.

In CA Patent No. 380,126, Andrew Palko discloses an oil burner comprising an electric heating element to pre-heat the burner so as to cause instant vaporization of the fuel oil as it is fed to the burner. This system includes temperature control means to regulate the fuel oil temperature without specifying any particular fuel oil temperature or temperature range, which would be required to obtain the claimed vaporization and desired combustion efficiency or emission reduction.

In CA Patent No. 457,123, Earl J. Senninger discloses an oil burner especially adapted for heavy oils. Such heavy fuel oils are pre-heated by way of an electric heating element prior to reaching the atomizing nozzle of the burner unit. Here the desired fuel oil operating temperature range is described as a temperature to be such as to insure against carbonizing of the fuel, which would normally be a temperature just short of combustion.

In U.S. Pat. No. 4,392,820, Niederholtmeier discloses a system for operating a heating appliance comprising the combination of unheated conventional fuel oil and pre-heated heavy waste oil in two separate pressure controlled distribution networks, precluding any intermingling of the two fuel sources. The waste oil is pre-heated to it's flash point level in order to reduce its viscosity and to render it combustible, and is fed to the burner after conditioning the burner by first operating it for a period of time with conventional untreated fuel oil, facilitating subsequent combustion of treated waste oil.

In U.S. Pat. No. 5,888,060 a method and device is disclosed to increase combustion efficiency of heating appliances. The disclosure is based on pre-heating hydrocarbon fuel to a moderate temperature level prior to combustion within a range of 37 degrees F. and the fuel's flashpoint temperature prior to the fuel entering the furnace flow valve. This results in reduced fuel flow instead of obtaining the effect of fuel injection.

For the purpose of creating a fuel injection condition for natural gas and propane gas, as well as for other conventional hydrocarbon fuels for use in appliances incorporating a burner located in a combustion zone, so as to increase fuel flow velocity and flame speed during combustion of such fuels in accordance with the present invention, a different set of circumstances is required.

In order to effect combustion efficiency and a noticeable reduction in harmful flue gas emission, an appliance burner will respond to fuel delivered to its burner nozzle at an increased velocity without causing the typical "blowout" condition. Such effect is obtained by decreasing the density of fuel while at the same time increasing the volume of the fuel by constantly and specifically elevating fuel pre-combustion temperature level. Such elevated temperature level must not be as high as to approach the flash point temperature of the fuel, as this would interfere with the function of the burner orifice, resulting in a loss of combustion efficiency, which would be contrary to the teaching in this disclosure In fact, the most advantageous fuel pre-combustion operating condition, according to the present invention, is to effect maximum fuel expansion and fuel volume increase and effecting fuel input velocity of the normally low temperature delivered fuel after the fuel has passed through the furnace operating valve, or a special one-way flow control valve, just ahead of the furnace orifice, without causing interference with the conventional combustion process of the appliance. This will create the effect of fuel injection without causing flame blowout during ignition.

During more frigid periods of the year, when heating appliances are usually in operation, fuel stored in storage tanks especially, and fuel transported in conduits exposed to the elements for considerable distances, remains at a temperature well below the optimal contemplated operating range, and pre-heating fuel economically could provide a number of significant advantages available for both gas and oil applications. Even appliances operating during the summer period, such as gas fired cooling appliances or residential, commercial and industrial water and process heaters, may operate more efficiently with the contemplated fuel injection method and device.

It is an established fact that most fluid hydrocarbon fuels may expand in volume by approximately 1% for each 5 degrees Fahrenheit of fuel temperature increase. Therefore, in a condition where such fuel is delivered to the burner mechanism at a low temperature, especially when reaching levels below 35 degrees Fahrenheit, fuel pre-heating, especially at a temperature reaching 900 degrees Fahrenheit would automatically result in a possible expansion of fuel volume of up to 180% while maintaining the same fuel mass.

Furthermore, such expanded fuel delivered to the burner orifice at its more optimal volume and flow velocity, but at the same fuel mass, would produce significantly more intense and complete combustion due to its higher flame speed and higher flame temperature, with the expanded lower density fuel allowing for a more rapid and complete fuel mix and advanced ignition. It creates the effect of fuel injection without the danger of flame blow-out, resulting in a measurable increase in burner efficiency as well as a measurable decrease in harmful flue gas emission. The fuel expansion must however be controlled by way of a special one-way valve such as to increase fuel flow velocity in the direction of flow only, wherein the increased fuel volume due to fuel pre-heating occurring just ahead of the orifice, results in a significant increase in velocity of less dense fuel through the burner orifice.

It therefore stands to reason that such a simple method and device, which provides an economical method for energy efficient fuel injection, increasing flame temperature and flame speed during combustion in an appliance by pre-heating of its conventional fluid hydrocarbon fuel just ahead of the burner orifice, would be most desirable.

Most prior art examined however seems to be specifically designed to treat only unconventional combustion fuels like heavy fuel oils or waste oils, and then in all cases, such prior art must rely without exception on additional heating elements to effect the temperature pre-heating process to the level of up to or above fuel vaporization or up to the flash point level of the fuel. This is of course contrary to the teaching disclosed in the present invention and outside the function of the method and device contemplated and described further herein, and there is no prior art available at all which teaches the pre-heat treatment of natural gas or propane gas for the purpose of causing the effect of fuel injection and increasing ignition and flame speed as well as general combustion dynamics in accordance with this invention.

Furthermore, it is still presently believed in the gas combustion appliance industry that pre-heating of fuel, as contemplated in this invention, is not affective to cause a fuel injection effect and thereby increase combustion dynamics. In fact, a correction formula is always employed in the industry to eliminate any variance in fuel efficiency calculations due to a change in fuel supply temperature or fuel density. Such correction formula calculation may be found in the "Gas Engineers Handbook", Ninth Printing, Chapter 8, "Gas Calorimetry", Pages 6–42.

Therefore, the method and device as disclosed in the present invention is completely contrary to industry norm, and is not at all obvious.

SUMMARY OF THE INVENTION

The present invention therefore discloses a method and device to reduce fuel density while at the same time increasing fuel volume in order to increase fuel input flow velocity without causing a blowout condition at combustion, thereby creating the effect of a fuel injection process similar to the process presently employed with automotive engines but without requiring a booster pump. The present effect is generally achieved by preheating natural gas or propane gas or other conventional fluid hydrocarbon fuels after it has been delivered to the appliance manifold, past a special one-way flow control valve or past the appliance's fuel pressure valve, as commonly used in today's typical residential, commercial and industrial equipment and appliances incorporating a burner located in a combustion zone. This method is able to provide a certain amount of combustion dynamics improvement while at the same time reducing harmful flue gas emissions.

Such method incorporates a device, which may be able to rely solely on heat generated by the appliance as the heat source for its fuel pre-heating operation, consisting of the following basic components.

It comprises a fuel supply conduit defining a heat exchanger assembly, located in the appliance manifold area beyond a one-way flow valve, or located beyond the appliance flow control valve should the appliance be so equipped, through which the fuel is routed on its way to the appliance's burner nozzle. This heat exchanger assembly is located in a heating zone which employs heat from the appliance's combustion area or adjacent the appliance's interior flue gas vent area. Where access to any of such heat source locations is difficult, the heating zone may employ heat from a heat source unrelated to the appliance. The size of the heat exchanger assembly and the volume of fuel it is able to pre-heat prior to combustion is relative to the fuel flow velocity achieved, and the larger the volume the higher the fuel flow velocity. The heat exchanger assembly may in certain applications incorporate a heat equalizer segment from heat storage material, as part of the heat exchanger assembly, in order to equalize heat transfer from the heating zone to the heat exchanger during the on/off cycles of the appliance. To prevent the fuel temperature from rising to a range above the fuels' flash point or vaporization level, the heat exchanger configuration is designed to accommodate fuel flow such as to control delivery of fuel to the appliance's burner orifice at a constant and pre-set desired optimal operating temperature range of between 165 and 900 degrees Fahrenheit, should the heating zone be subject to drastic temperature fluctuations. The contemplated general fuel operating temperature however must range somewhere between above 100 degrees Fahrenheit and below the fuel's flash point level or it's vaporization temperature, as the case may be. This is especially desirable for application to appliances located outside, like commercial rooftop furnaces and the like, where the heat exchanger may be situated in a heating zone adjacent the interior flue gas vent area of the appliance, exposed to high flue gas temperatures. The outside ambient temperature, which of course controls the operating mode and cycle of the appliance by way of the appliance's thermostat setting, would therefore also become a part of this fuel temperature balancing control mechanism.

The device operates according to the following method.

Fuel is routed from the incoming general fuel supply conduit past the appliance operating valve through a fuel supply conduit defining a heat exchanger assembly, which is located in a heating zone between the operating valve of the appliance, should it be so equipped, or a special one-way flow control valve and the burner orifice, directly to the burner within the combustion zone of the appliance. During the appliance's operation, heat is transferred to the heating zone, which may be located adjacent the combustion area of the appliance or adjacent an alternate heat source area, pre-heating the fuel passing through the heat exchanger assembly located in the heating zone. In order to control the pre-selected fuel operating temperature, various means may be employed. The preferred means my rely on the dimensions of the heat exchanger assembly, its effect on fuel volume and flow velocity, it's distance in relation to the heat source operating the heating zone, and on the on and off cycle of the appliance. Another means may employ a heat storage material as part of the heat exchanger assembly, surrounding at least in part the heat exchanger assembly, thereby assisting in the control of the desired fuel operating temperature level by equalizing heat transfer to the fuel during the on/off cycle of the appliance and the related high/low temperature exposure of the fuel as it is passing through the heat exchanger assembly. Yet a further means may employ a combination of means as heretofore described.

A similar effect may be achieved for applications to some appliances, from which heat for pre-heating may not be economically extractable, by employing a device which pre-heats fuel by using a separate heat source other than a heat source related to the appliance's combustion zone, such as an electrical resistor element. Such heat source could then be adjusted to control the desired fuel temperature level in order to increase fuel volume to the required level.

Results obtained during tests conducted with liquid propane gas and natural gas, supplied at a high fuel expansion level to a typical combustion mechanism, have demonstrated the advantages of the contemplated method and device.

For a better understanding of the present invention and how the disclosed device in accordance with the before described method of operation will result in the herein detailed combustion efficiency improvement and emission reduction, reference should be had to the drawings and descriptive matter in which there are illustrated and described the preferred embodiments of the invention. However, while only a few embodiments of the invention have been illustrated and described, it is not intended to be limited thereby but only by the scope of the appended claims.

DETAILED DESCRIPTION OF A PREFERRED EMBODIMENT

Figure 1:
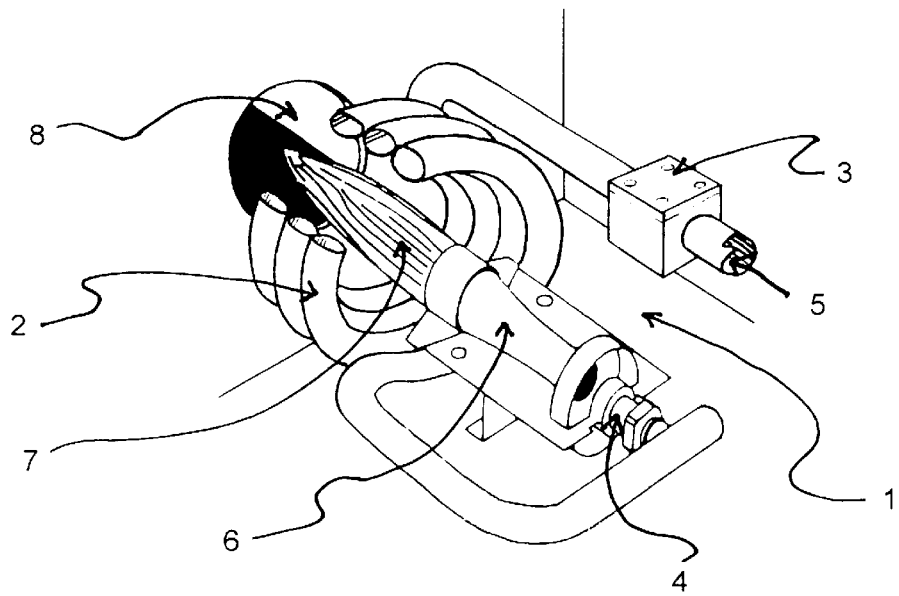
FIG. 1 of the drawings appended hereto depicts a partial cut-away isometric view of a typical burner in a combustion area, with a version of heat exchanger assembly extending through a heating zone partially surrounding the combustion flame in the combustion area of a typical appliance, illustrating the general method of operation of the invention.

Referring now to FIG. 1 of the drawings, there is shown, in partial cut-away isometric view, the operating method in a general layout of a fuel injection system located in the combustion area 1, comprising the the heat echanger assembly 2, with its one-way fuel flow valve 3 and combustion burner orifice 4. Fuel enters the heat exchanger assembly at arrow 5 and exits at orifice 4. The fuel is mixed with combustion air in mixing trumpet 6, producing flame 7 which has its exhaust gasses withdrawn through flue gas exhaust port 8.

The method of operation of a typical appliance fuel fuel injection system is as follows:

From the general fuel supply conduit or from the appliance's fuel supply connection, fuel is routed via a fuel conduit to the heat exchanger assembly with its heating zone located in the combustion area adjacent the burner flame. In order to significantly increase fuel flow velocity, the fuel is expanded and its volume increased by way of heat extraction from the combustion flame while the fuel is traveling through the heat exchanger and manifold conduit. The heat extraction may be effected directly from the combustion flame in the combustion area or from inside the flue gas exhaust ports. In some cases, where such arrangement is impossible, fuel heating may be effected from a source unrelated to the appliance. All other appliance components will operate as commonly understood in the art, except for the fact that fuel injection will now occur and combustion dynamics will be improved and harmful flue gas emission will be reduced.

Figure 2:
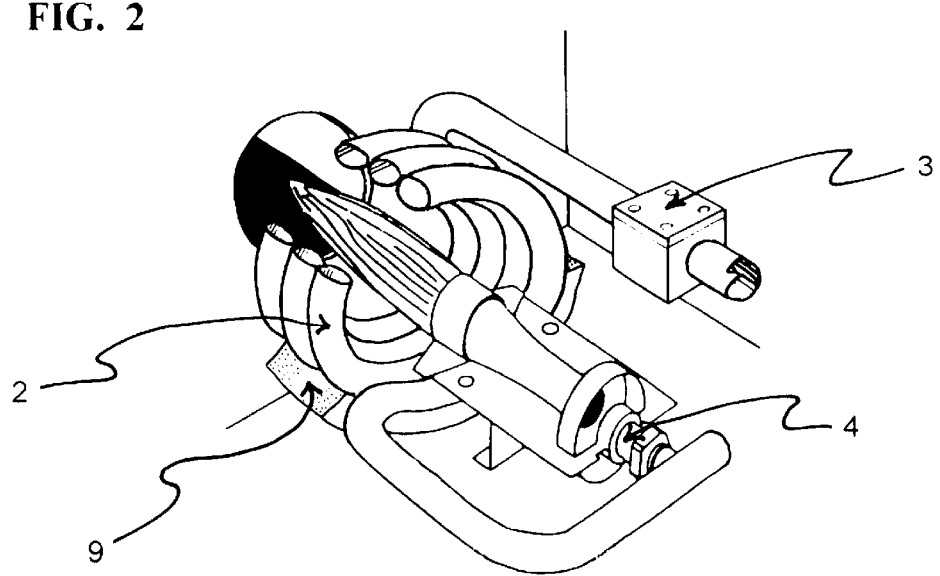
FIG. 2 of the drawings appended hereto depicts a partial cut-away isometric view of a typical burner in a combustion area as shown in FIG. 1, but with the heat exchanger assembly equipped with a heat storage material.

In FIG. 2 of the drawings, there is shown again in partial cut-away isometric view, the operating method in a general layout of a fuel injection system as shown in FIG. 1, but this time the heat exchanger assembly 2 with its one-way fuel flow valve 3 and burner orifice 4, inludes a heat storage mantle 9, surrounding one side of the heat exchanger assembly.

Figure 3:
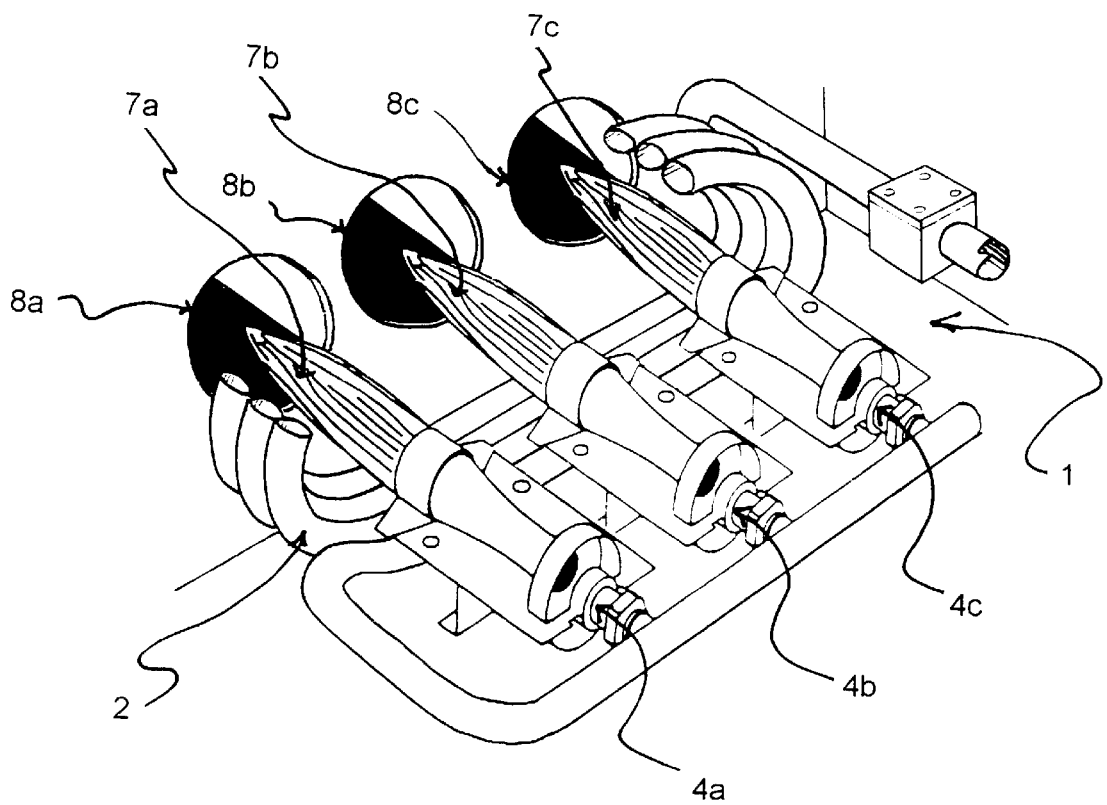
FIG. 3 of the drawings appended hereto depicts a partial cut-away isometric view of a typical multiple burner arrangement in a combustion area, with the heat exchanger assembly extended to be exposed to the multiple combustion flames in the combustion area.

In FIG. 3 of the drawings is shown a partial cut-away isometric view of a heat exchanger assembly 2 located in combustion area 1. This time the combustion area accomodates multiple burner orifices 4a, 4b and 4c. Fuel enters the heat exchanger assembly at arrow 5, but now exits at the multiple orifices, producing multiple flames 7a, 7b and 7c. The heat exchanger assembly 2 is now designed such as to be able to extract heat from the multiple combustion flames. The combustion exhaust gas is now being withdrawn through flue gas exhaust ports 8a, 8b and 8c.

A device according to the present invention may be manufactured using established manufacturing techniques and components known in the art, and such device may then be attached to a heating appliance using natural gas or propane gas or other conventional fluid hydrocarbon fuels, and may be operated in accordance with the method as disclosed herein.

I claim:

1. A method for achieving the effect of fuel injection with a gaseous fuel, including natural gas or propane gas, employed as conventional fluid hydrocarbon fuel, which method results in the reduction of fuel density while at the same time significantly increasing the flow velocity of such density reduced fuel, improving combustion dynamics through increasing ignition speed and flame speed during combustion without the danger of causing flame blowout in a combustion mechanism having a defined combustion chamber and a burner therein, comprising:

a) providing natural gas or propane gas as fuel for said combustion mechanism;
   b) directing said fuel beyond the operating valve or one-way check valve within said combustion mechanism through a fuel supply conduit defining a heat exchanger assembly that extends through a heating zone at said combustion mechanism;
   c) heating the fuel as it passes through said heat exchanger assembly to a general fuel operating temperature level of between 100 degrees Fahrenheit and a temperature just below the fuel's flash point level;
   d) increasing the volume and reducing the density of said heated fuel to cause a fuel injection effect of high velocity fuel flow in said burner without causing a flame blowout condition;
   e) maintaining a continuous supply of high velocity fuel flow to said burner in the combustion chamber of said combustion mechanism.

2. A method according to claim 1, wherein the heat transfer to the fuel is stabilized with a heat storage material forming part of the heat exchanger assembly.

3. A method according to claim 1, wherein said heating zone is located adjacent an exhaust port area of said combustion mechanism.

4. A method according to claim 1, wherein said heating zone is located at a heat source other than an exhaust port area of said combustion mechanism.

5. A method according to claim 1, wherein said general fuel operating temperature level allows for a preselected optimal fuel operating temperature range between 165 degrees and 900 degrees Fahrenheit.

6. A method according to claim 1, wherein the combustion mechanism is located in a space heater.

7. A method according to claim 1, wherein the combustion mechanism is located in a water heater.

8. A method according to claim 1, wherein the combustion mechanism is located in a process heater.

9. A method according to claim 1, wherein the combustion mechanism is located in a power generator.

10. A device for achieving the effect of fuel injection with a gaseous fuel, including natural gas or propane gas, employed as conventional fluid hydrocarbon fuel, which device results in the reduction of fuel density while at the same time significantly increasing the flow velocity of such density reduced fuel, improving combustion dynamics through increasing ignition speed and flame speed during combustion without the danger of causing flame blowout in a combustion mechanism having a defined combustion chamber and a burner therein, comprising:

a) a fuel supply conduit defining a heat exchanger assembly having a fuel inlet and a fuel outlet, extending through a heating zone at the combustion mechanism and providing the conveyance of fuel to the combustion mechanism;
   b) means for maintaining a continuous supply of fuel to the burner in the combustion chamber of said combustion mechanism at a preselected general operating temperature level ranging between 100 degrees Fahrenheit and a temperature just below the fuel's flash point level.

11. A device according to claim 10, wherein a heat storage material forms part of said heat exchanger assembly.

12. A device according to claim 10, wherein said heating zone is located adjacent an exhaust port area of said combustion mechanism.

13. A device according to claim 10, wherein said heating zone is located at a heat source other than an exhaust port area of said combustion mechanism.

14. A device according to claim 10, wherein said means maintain a continuous supply of fuel to the burner of said combustion mechanism at a general fuel operating temperature level which allows for the preselected optimal fuel operating temperature range between 165 degrees and 900 degrees Fahrenheit.

15. A device according to claim 10, wherein the combustion mechanism is located in a space heater.

16. A device according to claim 10, wherein the combustion mechanism is located in a water heater.

17. A device according to claim 10, wherein the combustion mechanism is located in a process heater.

18. A device according to claim 10, wherein the combustion mechanism is located in a power generator.

* * * * *